Figure 3:
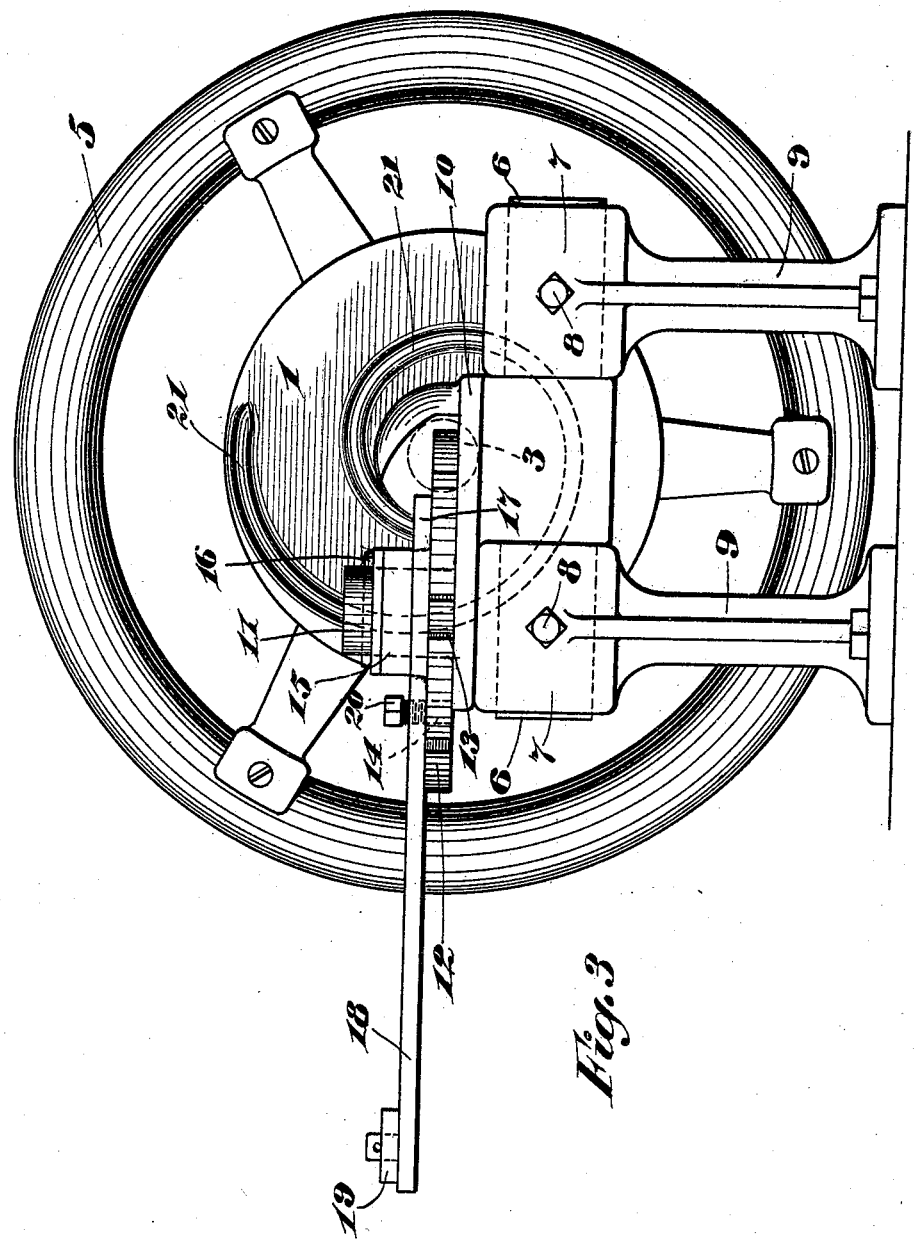

P. LORD.
STEERING APPARATUS.
APPLICATION FILED OCT. 29, 1909.
982,215.
Patented Jan. 17, 1911.
2 SHEETS—SHEET 1.
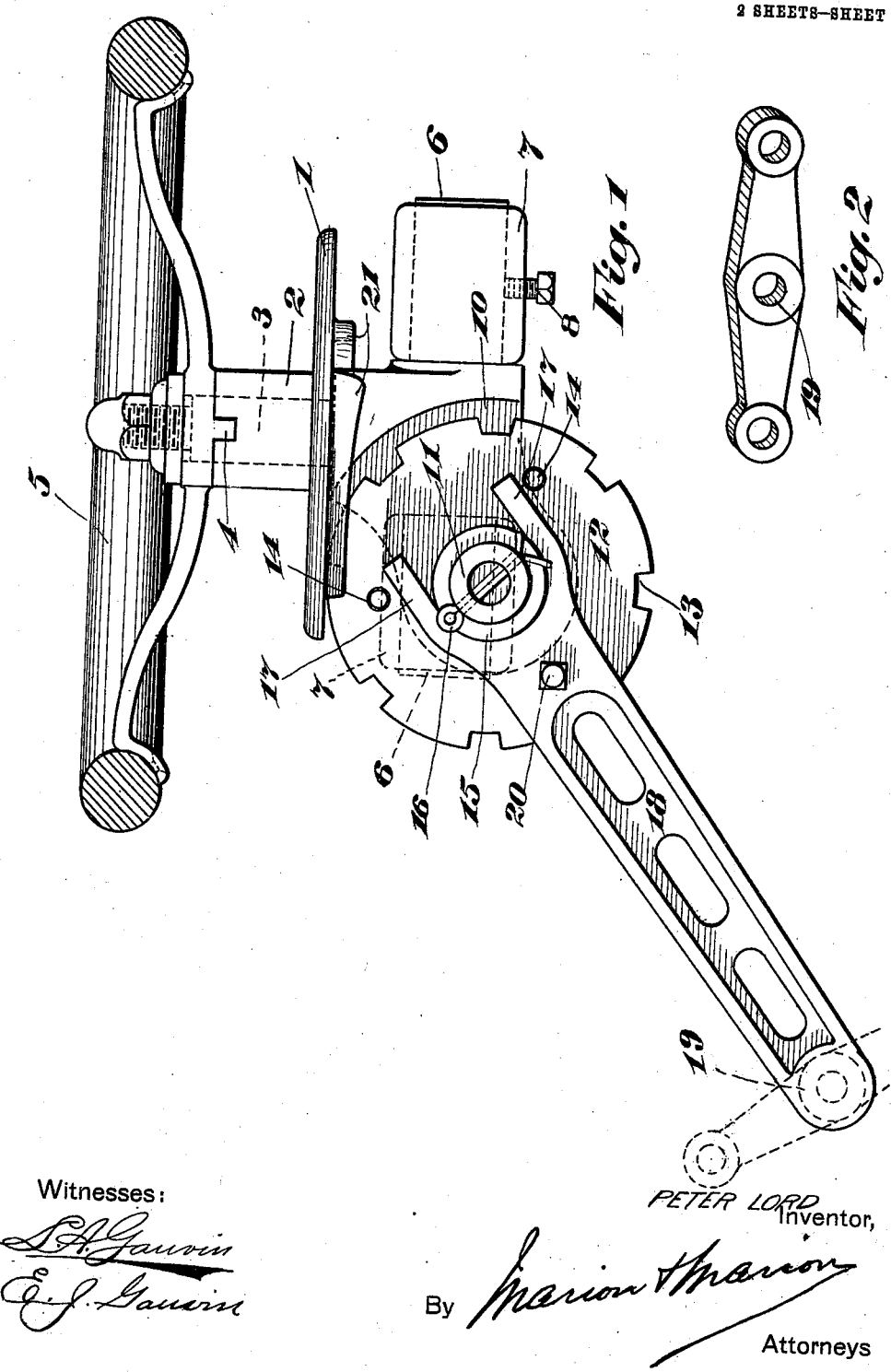
Witnesses:
PETER LORD, Inventor,
By
Attorneys

UNITED STATES PATENT OFFICE.

PETER LORD, OF MONTREAL, QUEBEC, CANADA, ASSIGNOR OF ONE-FOURTH TO JOSEPH A. H. HEBERT, ONE-FOURTH TO CHARLES LELUAU, AND ONE-EIGHTH TO GUSTAV ITZWEIRE, ALL OF MONTREAL, CANADA.

STEERING APPARATUS.

982,215.  Specification of Letters Patent.  Patented Jan. 17, 1911.

Application filed October 29, 1909. Serial No. 525,393.

*To all whom it may concern:*

Be it known that I, PETER LORD, a subject of the King of Great Britain, residing at 190 Berri street, in the city and district of Montreal, in the Province of Quebec, Canada, have invented certain new and useful Improvements in Steering Apparatus; and I do hereby declare that the following is a full, clear, and exact description of the invention, such as will enable others skilled in the art to which it appertains to make and use the same.

The invention to be hereinafter described relates to steering apparatus and more particularly to vehicle steering gear for boats, automobiles, and the like.

Broadly speaking, it comprises an adjustably mounted plate or disk provided with an involute cam, a notched disk adapted to be engaged and driven by said involute cam, an arm adapted to be connected to a rudder post or other steering member, and means for adjustably connecting said arm to the disk.

In order to more clearly disclose the construction, operation, and use of the invention, reference should be had to the accompanying drawings forming part of the present application.

Throughout the several figures of the drawings like reference characters designate the same parts.

In the drawings:—Figure 1 is a plan view of the invention; Fig. 2 is a perspective of a rudder head, detached; and, Fig. 3 is a side elevation of the invention complete.

Referring to the drawings in detail, 1 indicates a plate or disk secured to a sleeve 2 revolubly disposed about a post 3. The upper end of sleeve 2 is provided with notches adapted to receive lugs 4 extending from the center of a hand wheel 5 which is freely revoluble about one end of the post 3. The opposite end of the post is enlarged to form an offset, or shoulder, or bearing surface on which the under face of the disk 1 rests. Stub shafts 6 extend from the lower end of the post 3 and are adapted to turn freely in collars or sleeves 7 which may be mounted in, or form part of a suitable bracket 9. In this way, the disks 1 and 12 may be swung to the desired angle for connection with the arm 18. When once moved to the desired position it may be so secured by means of set screws 8.

Extending from one end of the post 3 is a flange or plate 10 provided with a short thick stud 11 about which is loosely journaled a disk 12 provided with a series of notches 13 in its circumference, and a series of holes 14. This disk is held in operative position by a washer 15 and cotter pin 16. Closely fitted about the stud 11 is the yoke or fork 17 of an arm 18, the opposite end of which is adapted to be made fast to a rudder head 19 or other steering element. For purposes of adjustment and to prevent relative movement between the disk 12 and arm 18, a set screw 20 is used. This is passed through the arm and selectively seated in one of the holes 14.

The operative face of the disk 1 is provided with an involute cam 21 increasing in depth from its inner to its outer end. The reason for this increase is because of the curvature of disk. 12. When a notch 13 is first engaged by the end of involute cam 21, such notch will be at a considerable distance below the disk 1. However, as the disk 12 is rotated by the involute cam the notch will approach disk 1 until there is just a clearance between them. Then it will again fall away from the disk 1. At this point the next notch has been engaged by the high point of involute cam 21 so that rotation of disk 12 continues.

By forming the flange 10 and its stud 11 on one end of the post 3 and by mounting the disk 1 and hand wheel 5 on the post and near the opposite end thereof, the whole actuating mechanism may be swung together to the desired position for connection to the arm 18.

The adjustability of the device, of course, allows its connection to the arm 18 at practically any lateral inclination of the arm. The segments of the disk 12 between the successive notches 13 are sufficiently narrow to prevent simultaneous engagement between the opposite edges of a segment and any two portions of the involute cam, thus preventing locking of the device as the involute cam is rotated. Preferably, the notches 13, also, are made considerably wider than the widest cross section of the involute cam, to allow slight play of the cam in the notch, thus avoiding binding and unnecessary friction.

It is thought that the operation and use of the invention will be clear from the preceding detailed description.

Changes may be made in the construction, arrangement and disposition of the several parts of the invention, without in any way departing from the field and scope of the same, and it is meant to include all such within this application, wherein only a preferred form has been disclosed.

Having thus fully described my invention, what I claim as new and desire to secure by Letters Patent, is:—

1. A steering wheel and a disk turning therewith having an involute cam on its operative face, in combination with a peripherally notched disk arranged in a plane at right angles to that of the former disk in order that its notches may be successively engaged by said cam, a post on which the first mentioned disk is free to turn and which is provided with stub shafts and with a stud for said notched wheel at right angles to said post, an arm connected to and reciprocated by the notched disk, bearings receiving said stub-shafts and permitting the said post and stud and the disk carried by said post to be tilted into various positions of inclination and screws working through said bearings to lock said parts in any position of inclination to which they may be adjusted substantially as set forth.

2. A steering wheel and a cam-faced disk turning therewith, in combination with a peripherally notched disk arranged at an angle to the former disk so that its notches may be successively engaged by the cam-face of the latter, a post on which the former disk is mounted for turning freely and which is provided with lateral stub-shafts and a stud on which said notch disk turns, bearings for said stub-shafts permitting all the parts named to be tilted together from one inclined position to another, means for locking said parts in any such position and means for transmitting motion from said notched disk for the purpose set forth.

In witness whereof I have hereunto set my hand in the presence of two witnesses.

PETER LORD.

Witnesses:
T. MYNARD,
E. J. GAUVIN.